(12) United States Patent
Leppinen et al.

(10) Patent No.: US 7,785,395 B2
(45) Date of Patent: Aug. 31, 2010

(54) METHOD FOR THE RECOVERY OF GOLD FROM SULPHIDE CONCENTRATE

(75) Inventors: Jaakko Leppinen, Pori (FI); Olli Hyvärinen, Pori (FI); Seppo Heimala, Pori (FI); Veikko Palosaari, Pori (FI); Matti Hämäläinen, Pori (FI); Tuula Hämäläinen, legal representative, Pori (FI)

(73) Assignee: OUTOTEC OYJ, Espoo (FI)

( * ) Notice: Subject to any disclaimer, the term of this patent is extended or adjusted under 35 U.S.C. 154(b) by 161 days.

(21) Appl. No.: 11/884,125

(22) PCT Filed: Feb. 14, 2006

(86) PCT No.: PCT/FI2006/000047

§ 371 (c)(1), (2), (4) Date: Apr. 22, 2008

(87) PCT Pub. No.: WO2006/087412

PCT Pub. Date: Aug. 24, 2006

(65) Prior Publication Data

US 2009/0038440 A1    Feb. 12, 2009

(30) Foreign Application Priority Data

Feb. 16, 2005    (FI)    .................................. 20050176

(51) Int. Cl.
*C22B 3/04*    (2006.01)
*C22B 3/18*    (2006.01)
*C22B 11/06*    (2006.01)

(52) U.S. Cl. .............................. 75/739; 75/744; 423/27; 423/34; 423/40; 205/570; 205/571

(58) Field of Classification Search .................. 75/739, 75/744; 423/27, 34, 40; 205/570, 571
See application file for complete search history.

(56) References Cited

U.S. PATENT DOCUMENTS 3,798,026 A * 3/1974 Milner et al. .................. 75/424

(Continued)

FOREIGN PATENT DOCUMENTS

CA    2448999 A1    8/2004

(Continued)

*Primary Examiner*—George Wyszomierski
*Assistant Examiner*—Tima M McGuthry-Banks
(74) *Attorney, Agent, or Firm*—Buchanan Ingersoll & Rooney PC (57) ABSTRACT

The invention relates to a method for recovering gold from a sulphidic concentrate, particularly one containing arsenopyrite and/or pyrite, hydro-metallurgically. The concentrate is first subjected to leaching with a concentrated solution of alkali chloride and copper (II) chloride, by means of which the copper minerals and some of the gold in the concentrate are made to dissolve. Elemental sulphur and precipitated iron and arsenic compounds are separated from the leaching residue using physical separation methods, whereby the first intermediate is obtained, which contains gold-bearing sulphide minerals and gangue minerals as well as the gold that remains undissolved. The free gold that remains undissolved is separated by means of gravity separation methods. After gravity separation, additional comminution is carried out, after which the sulphide minerals are decomposed and the gold-containing solution or residue is routed to the concentrate leaching circuit.

24 Claims, 3 Drawing Sheets

U.S. PATENT DOCUMENTS

| | | |
|---|---|---|
| 5,489,326 A * | 2/1996 | Thomas et al. ............... 75/744 |
| 6,007,600 A | 12/1999 | Hyvärinen et al. |
| 6,264,841 B1 * | 7/2001 | Tudor .......................... 210/688 |
| 6,315,812 B1 | 11/2001 | Fleming et al. |
| 6,395,063 B1 * | 5/2002 | Cole ............................ 75/744 |
| 6,461,577 B1 | 10/2002 | Lindström et al. |
| 6,652,622 B2 | 11/2003 | Kohr |
| 7,514,050 B2 * | 4/2009 | Brierley et al. ............... 423/27 |
| 7,604,783 B2 * | 10/2009 | King et al. ................... 423/36 |
| 2005/0160877 A1 * | 7/2005 | Hamalainen et al. ......... 75/744 |
| 2008/0112864 A1 * | 5/2008 | Lalancette ................... 423/40 |

FOREIGN PATENT DOCUMENTS

| | | |
|---|---|---|
| WO | WO 03/091463 A1 | 11/2003 |
| WO | WO 2004/059018 A1 | 7/2004 |

* cited by examiner

METHOD FOR THE RECOVERY OF GOLD FROM SULPHIDE CONCENTRATE

BACKGROUND

1. Field

Disclosed herein is a method for recovering gold hydrometallurgically from a sulphidic concentrate, particularly one containing arsenopyrite and/or pyrite. The concentrate is first subjected to leaching with a concentrated solution of alkali chloride and copper (II) chloride, by means of which the copper minerals and some of the gold in the concentrate are made to dissolve. Elemental sulphur and precipitated iron and arsenic compounds are separated from the leaching residue using physical separation methods, whereby the first intermediate is obtained, which contains gold-bearing sulphide minerals and gangue minerals as well as the gold that remains undissolved. The free gold that remains undissolved is separated by means of gravity separation methods. After gravity separation, additional comminution is carried out, after which the sulphide minerals are broken down and the gold-containing solution or residue is routed to the concentrate leaching circuit.

2. Description of Related Art

Copper concentrates contain variable amounts of gold. In smelting plant processes gold is generally recovered with a high yield via anodic sludge treatment processes. In hydrometallurgical copper processes the recovery of gold from concentrates causes a specific problem. Gold recovery in process alternatives using sulphate-based leaching is usually based on cyanide leaching of leach residue, whereby however the elemental sulphur formed in copper leaching disrupts the cyanide leaching of gold. In chloride-based copper processes, both the gold bound to copper minerals and the free gold dissolve to a large extent, but the gold bound to pyrites and silicates as fine inclusions or to sulphide minerals as what is termed invisible gold, remains mainly undissolved. Invisible (submicroscopic) gold is inside the mineral particles as very fine inclusions or in the mineral lattice. Some of the coarse free gold contained in the concentrate also remains undissolved due to too short a retention time.

In refractory gold concentrates, the proportion of copper and other base metals is usually small. The recovery of gold by cyanide leaching alone does not succeed with concentrates in which the gold is refractory or submicroscopic. One example of this kind of concentrate is a concentrate containing arsenopyrite and/or pyrite. Gold recovery from such concentrates to requires the almost total decomposition of the minerals containing the gold. If cyanide leaching is used, the concentrate requires pretreatment, such as roasting, bioleaching or oxidising pressure leaching.

Outokumpu Oyj has developed a hydrometallurgical copper recovery process, the HydroCopper™ process, which is described for example in U.S. Pat. No. 6,007,600. According to this, the copper concentrate is leached in atmospheric conditions into a concentrated alkali chloride solution using divalent copper as oxidant. The leaching of gold in connection with the HydroCopper process is described in for example WO patent application 03/091463. According to this, gold dissolves during copper concentrate leaching as a chloride complex and is recovered from the solution using activated carbon. However, if gold appears in a difficult form e.g. in pyrite and/or in silicate minerals, it cannot be leached with the method described in the above-mentioned WO application.

Patent application WO 2004/059018 describes a gold recovery process, in which refractory gold-containing concentrate such as arsenopyrite or pyrite is treated in a halide environment in atmospheric conditions. The arsenopyrite and pyrite lattice is broken down using chemical oxidation. Oxygen is used to form a soluble oxidant in the form of divalent copper or trivalent iron. With divalent copper, arsenopyrite decomposes and forms arsenic acid, divalent iron, sulphur and monovalent copper. Iron and copper are oxidised with oxygen to a higher valence. The trivalent iron thus formed reacts further with the arsenic acid forming ferric arsenate ($FeAsO_4$). The decomposition of pyrite occurs in the same way by means of divalent copper, so that sulphuric acid and divalent iron ($Fe^{2+}$) are formed. Divalent iron is oxidised to trivalent and monovalent copper to divalent by means of oxygen. Iron is precipitated as hematite and the solution is neutralised by feeding limestone into it, so that gypsum ($CaSO_4$) is precipitated out. If carbon is included, the concentrate is roasted after the leaching stages. Gold dissolves from the pyrite as a chloride complex and is recovered using activated carbon.

Refractory gold ores can be treated with the method according to WO patent application 2004/059018, but the disadvantage is that all the sulphur generated from both arsenopyrite leaching and copper minerals leaching has to be oxidised to sulphate. Arsenic first enters the solution from which it is is precipitated as ferric arsenate, but the sulphur generated in arsenopyrite leaching proceeds with the solids to the subsequent leaching stage, where it is oxidised to sulphate. In this case there is a great need for oxidation and likewise the need for neutralisation increases considerably, which weakens the economy of the process significantly. The entire amount of concentrate in the process is ground very fine, up to 80% smaller than 6-10 µm, so that the demand for grinding capacity is large, and the grinding energy consumption is high while at the same time sludging problems increase and both solids and liquid separation stages become more complicated.

U.S. Pat. No. 6,315,812 describes the Platsol™ process, in which sulphide minerals or smelting matte are treated with oxidising pressure leaching in a solution containing chloride and sulphate.

In the Platsol process all the sulphur in the sulphide phase is oxidised to sulphate, whereupon the need for neutralisation increases greatly, reducing the process economy. The use of chloride in autoclave conditions leads to expensive investments due to the corrosion question etc.

U.S. Pat. No. 6,461,577 describes a two-stage bioleaching method for leaching sulphides that contain arsenic. Gold is recovered from the resulting solution by cyanide leaching.

Bioleaching as the only leaching method for the total amount of concentrate is fairly slow. The disadvantages of the bioleaching method are the difficult solubility of chalcopyrite and the oxidation of the entire amount of concentrate to sulphate, where the need for neutralisation is large. In addition, cyanide is used to leach gold, which poses a risk for the environment.

SUMMARY

Using the method described herein, gold can be recovered in connection with a chloride leaching process from refractory concentrates, particularly from those containing arsenopyrite and/or pyrite such as copper concentrates, where the gold is bound to iron pyrite and silicate minerals, or preferably from a mixture of different copper concentrates and refractory concentrates. In addition, the gold yield from coarse gold and gold bound to silicate minerals can be improved immensely. The oxidation of sulphur to sulphate is minimised, so that the amount of sulphuric acid to be neutralised is significantly lower.

Disclosed herein is a method for the recovery of gold from sulphidic concentrates, which are copper concentrates, refractory, particularly those containing arsenopyrite and/or pyrite and mixtures of the above. The leaching of the copper sulphide minerals and partially gold from the concentrate takes place in a concentrated aqueous solution of alkali chloride and copper (II) chloride in atmospheric conditions. Some of the gold dissolves and is recovered from the solution by known methods such as activated carbon or ion-exchange resins. The majority of elemental sulphur and iron oxides (also including precipitated arsenic compounds) are separated from the leaching residue using physical or equivalent separation methods, so that what remains is mainly a gold-containing product containing pyrites and gangue minerals. The gangue minerals are mostly silicates. Coarse, undissolved gold is separated from this first intermediate product by means of gravity separation. Then the intermediate is ground to a sufficient fineness and leaching of the second intermediate thus formed and the pyrite and remaining arsenopyrite in it is performed by known methods. Known leaching techniques that are applicable to the method include especially sulphate-based pressure leaching and atmospheric and bacteria-assisted sulphate leaching as well as atmospheric chloride leaching. The gold-containing stream that exits leaching, which depending on the leaching method chosen is a solution or precipitate, is returned to the concentrate chloride leaching circuit.

Sulphidic copper concentrates such as chalcopyrite may contain gold, which is difficult to leach in chloride-based leaching. Gold may bind itself in this case to insoluble sulphide minerals such as pyrite. In addition gold is often bound to the gangue minerals of the concentrate such as silicates. If the gold is coarse, some of the gold typically remains undissolved due to too short a retention time. In most sulphidic concentrates that are difficult to process (known as refractory concentrates) pyrite and arsenopyrite are the major gold bearers.

A certain copper level is maintained in the chloride-based concentrate leaching stage solution, which is preferably around 20-60 g/l. If there is no copper in the concentrate, it is brought to the process. Some of the copper may be obtained from the process circuit as precipitate, which comes from later stages of the process. The copper is oxidised in the solution to divalent ($Cu^{2+}$) using an oxidising gas. Oxygen-containing gases and chlorine are used as the oxidising gas. The quantity of alkali chloride in the solution is 200-330 g/l. The leaching stage always includes several reactors, which are equipped with a mixer. Leaching occurs in atmospheric conditions, at a temperature of 80° C. (the boiling point of the solution). The oxidation-reduction potential of the solution should be high enough, at least at the end of the leaching, i.e. a minimum of 600 mV vs. Ag/AgCl electrode, so that the copper pyrite and at least part of the arsenopyrite decompose. The dissolving of gold requires a sufficiently high redox potential. Using an oxygen-containing gas and chlorine gas the redox potential of the solution can be raised to a value of 600-650 mV, whereupon gold dissolves effectively.

The following reactions take place in concentrate leaching:

Chalcopyrite Leaching:

$$CuFeS_2 + Cu^{2+} + \tfrac{3}{4}O_2 + \tfrac{1}{2}H_2O = 2Cu^+ + FeOOH + 2S \quad (1)$$

Arsenopyrite Leaching:

$$FeAsS + 7CuCl_2 + 4H_2O \rightarrow H_3AsO_4 + FeCl_2 + S + 5HCl + 7CuCl \quad (2)$$

$$H_3AsO_4 + FeCl_3 \rightarrow FeAsO_4 + 3HCl \quad (3)$$

Dissolving of Gold:

$$Au + 3CuCl_2 + 2Cl^- \rightarrow AuCl_4^- + 3CuCl + Cl^- \quad (4)$$

Oxidation of monovalent copper to divalent using oxygen or chlorine:

$$2CuCl + 0.5O_2 + 2HCl \rightarrow 2CuCl_2 + H_2O \quad (5)$$

$$2CuCl + Cl_2 \rightarrow CuCl_2 \quad (6)$$

As the above reactions show, copper (II) chloride dissolves the arsenopyrite, so that as a result of the reaction arsenic acid, iron (II) chloride, elemental sulphur, hydrochloric acid and copper (I) chloride are generated. If the potential is raised high enough, the elemental sulphur will react further to form sulphuric acid. The iron (II) chloride that is generated reacts with the copper (II) chloride to form iron (III) chloride, which further reacts with arsenic acid, so that poorly soluble ferric arsenate and hydrochloric acid are generated. Gold dissolves effectively at a leaching stage redox potential of 600-650 mV vs. Ag/AgCl electrode, when chlorine gas is fed to the stage. Chlorine gas, like the oxygen fed into the solution, simultaneously oxidises the cuprous chloride generated in the reactions to cupric chloride, as shown in reactions (5) and (6). It is known that arsenopyrite also dissolves either partially or totally in these conditions. It is advantageous to keep the pH of the leaching stage at a value of 1-2.5, so that the copper is not precipitated, but the iron and sulphur are precipitated as secondary phases such as ferric hydroxide or ferric arsenate. When concentrate leaching is performed preferably according to the HydroCopper™ process described in the prior art, the process includes chlor-alkali electrolysis, in which the chlorine and at least part of the alkali to be used in neutralisation can be exploited in this leaching stage. If another chloride process is used for leaching, the chlorine and alkali are formed in some other equivalent electrolytic process stage or ready-made industrial chemicals are used.

The leaching residue formed in concentrate leaching includes mainly iron oxides ($Fe_2O_3$) and hydroxides (FeOOH), sulphur and ferric arsenate. In addition, the leaching residue includes pyrite contained in the concentrate, some of the arsenopyrite and silicate minerals, which did not dissolve in the chloride leaching stage. The leaching residue also contains the gold bound to the sulphide minerals remaining undissolved as well as free coarse gold, which has not had time to dissolve completely in the concentrate leaching stage. Secondary phases, such as elemental sulphur, hematite and ferric arsenate appear in the leaching residue as extremely fine inclusions (<10 μm), whereas the pyrite, arsenopyrite and silicates clearly represent a coarser primary concentrate particle size range (20-150 μm). The leaching residue may also include fine silicates, which have accumulated in the chloride leaching from previous process stages.

The leaching residue is taken to the separation stage, where elemental sulphur and other secondary substances such as hematite and ferric arsenate are separated using physical separation methods. Fine silicate is also removed with the secondary substances. In this way the first intermediate product formed in the separation stage is composed mainly of the coarser pyrite, coarse-grained silicates, the rest of the arsenopyrite and gold. Physical separation methods used can be cyclone separation, elutriation, retarded settling, thickening, vibration, spiral separation or another equivalent method in which separation principles related to density and/or particle size are applied. Sulphur and other substances can also be removed by means of flotation. Physicochemical methods can also be used, whereby sulphur can be dissolved with a suitable solvent or separated in molten form using heat.

The free gold contained in the first intermediate product obtained from the separation stages of sulphur and fines is recovered with a method based on gravity difference i.e. difference in specific weight. In this way centrifugal separation (Knelson or Falcon separators), spiral separation, shaking, vibration or another corresponding method can be used, where the gold particles of higher density are separated from the other mineral substances. The gold content of the first intermediate is still low, because it is mixed with other substances (pyrite, silicates). The purpose of gravity separation is to make a product with a high gold content, so that it is possible to sell the product separately or return it to concentrate chloride leaching. If it is known in advance that the amount of metallic gold in the first intermediate is small, gravity separation can be omitted, so that the intermediate goes directly to the next stages and the gold is recovered later.

The remainder of the first intermediate, remaining from the free gold separation stage, is routed to a comminution stage, where it is ground sufficiently fine that the leaching rate of the hitherto undissolved sulphide minerals is raised significantly. The required particle size is $d_{80}$ 5-45 μm, preferably $d_{80}$ 5-15 μm $d_{80}$ means that 80% of the product is below the particle size mentioned. At the same time, the gold that is present as inclusions inside the gangue minerals with the concentrate is released. It is to be noted that this comminution is carried out on only a very small part of the total amount of concentrate, in order to avoid sludging problems affecting the entire process and to achieve substantial savings in grinding energy and comminution plant investments. The second intermediate thus generated is routed to leaching, by means of which the rest of the gold contained in the concentrate is obtained in such a form from which it can be recovered in the concentrate leaching circuit.

When the treatment of the second intermediate is leaching, it is total leaching, i.e. the aim is to solubilise all the sulphides. Treatment can also be roasting, in which pyrite is oxidised to iron oxide (hematite).

One embodiment of a preferred method to perform leaching of the second intermediate product is pressure leaching. In this case it is preferable to operate with a sulphate base, to avoid the corrosion problems that may be caused in these conditions by chloride. In pressure leaching the second intermediate is put into an autoclave, where it is leached at a temperature between 160-220° C. Oxygen-containing gas is also fed into the autoclave. The pyrite and rest of the arsenopyrite dissolve in pressure leaching, but the gold does not dissolve, it remains in the leaching residue. The leaching residue, which as well as gold contains hematite and fine gangue minerals, is routed to the concentrate leaching stage, where the gold dissolves at the end of leaching where high redox potential conditions prevail. The mass of the leaching residue is about 40% of the original feed. Gold is recovered from the solution by known methods, such as by means of activated carbon or ion-exchange resins. With respect to the hematite and fine silicates, from which gold has already been separated and leached, they are routed after chloride leaching to fines separation, where they are removed with sulphur and the rest of the precipitate.

In pressure leaching pyrite breaks down according to the following formula:

$$FeS_2 + 7.5O_2 + H_2O \rightarrow 2Fe^{3+} + 4SO_4^{2-} + 2H^+ \tag{7}$$

The solution is routed to neutralisation, where some advantageous neutralising agent such as limestone is used. The precipitate containing gypsum and iron oxides, iron hydroxides and ferric arsenate is removed from the circuit. The amount of gypsum-containing precipitate generated in neutralisation is about double that of the autoclave feed.

Another way to leach the second intermediate is to use bacteria-assisted oxidation (bioleaching), preferably in a sulphate environment. The nutrients and air needed by the bacteria are fed to the leaching stage; leaching provides sufficient sulphates. In bioleaching the temperature range is 30-60° C. As a result of leaching, pyrite dissolves but gold remains in insoluble form in the leaching residue, from where gold is recovered by routing the leaching residue to the concentrate leaching stage. Gold dissolves in the conditions of high redox potential that prevail at the end of concentrate leaching and it is recovered by means of activated carbon or ion-exchange resins. The solution formed in leaching is routed to neutralisation, where some advantageous neutralising agent such as limestone is used. The gypsum and iron precipitate formed are removed from the circuit.

The advantage of bioleaching is often the lower investment and operating costs than in the pressure leaching, and the fact that bioleaching is performed on only a small part of the concentrate fed into the process.

The leaching residue from both pressure and bioleaching can also be treated if necessary in a separate chloride leaching circuit, so that the leaching residue is not mixed into the main stream.

When leaching is carried out as chloride leaching, pyrite and the thus far undissolved arsenopyrite break down and the gold enters the solution as a chloro complex in the same stage. At the same time some of the gold bound to the gangue minerals dissolves. The copper-containing solution used in leaching is routed to the stage from some suitable stage of concentrate leaching, e.g. as atacamite or basic copper (II) chloride. An oxidising gas, which is an oxygen-containing gas and/or chlorine, is routed to leaching. When concentrate leaching is carried out according to the HydroCopper process described in the prior art, the process includes chlor-alkali electrolysis, where the chlorine formed can be exploited in this leaching stage. Either oxygen or oxygen-enriched air can be used as the oxygen-containing gas. The oxidation-reduction potential of the solution can be regulated by means of the oxidising gas to be at least 600 mV Ag/AgCl, preferably between 620-750 mV Ag/AgCl, so that the gold bound to pyrite also dissolves. The leaching kinetics of the fine pyrite in the leaching stage of the second intermediate are better than in the first leaching, which is due to the smaller particle size, the breaking down of the lattice and the reduction in passivation effects. Pyrite dissolves according to the following formula:

$$FeS_2 + Cu^{2+} + 4H_2O \rightarrow SO_4^{2-} + Fe^{2+} + 8H^+ + 7\ Cu^+ \tag{8}$$

The final result of leaching is that all the minerals of the second intermediate are leached except the fine gangue minerals. The solution is neutralised with some suitable neutralising agent like limestone. Neutralisation results in a leaching residue that contains gypsum, iron oxides, iron hydroxides and gangue minerals such as silicates, which are removed from the circuit. The gold-containing solution is routed to the gold recovery stage of concentrate leaching, where gold is recovered with e.g. activated carbon.

The selection of method used for leaching the second intermediate depends on the metallurgical results obtained with each concentrate.

DETAILED DESCRIPTION OF SPECIFIC EMBODIMENTS

Figure 1:
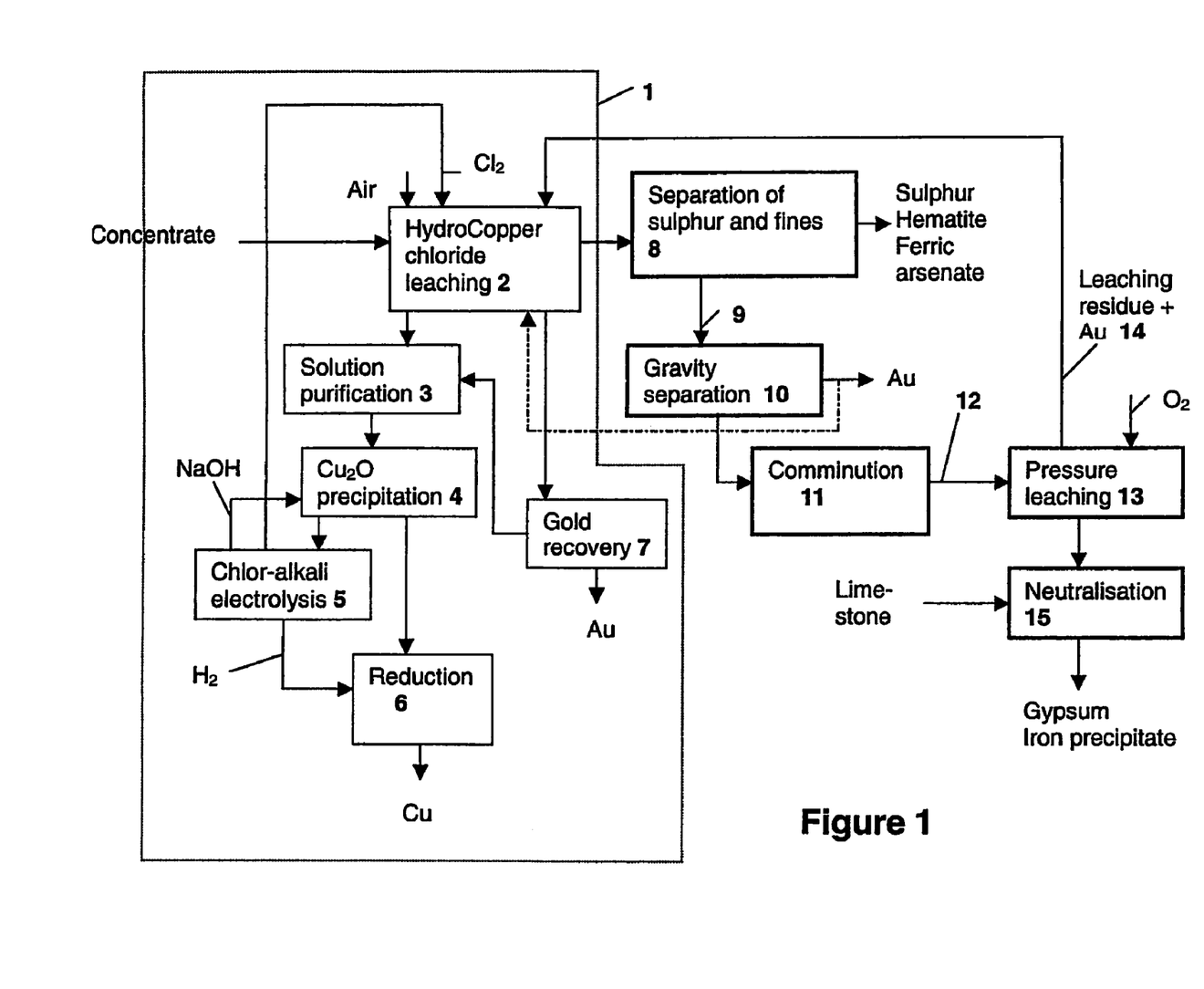
FIG. 1 is a flow chart of one embodiment of the method described herein, where leaching is performed as sulphate based pressure leaching.
Figure 2:
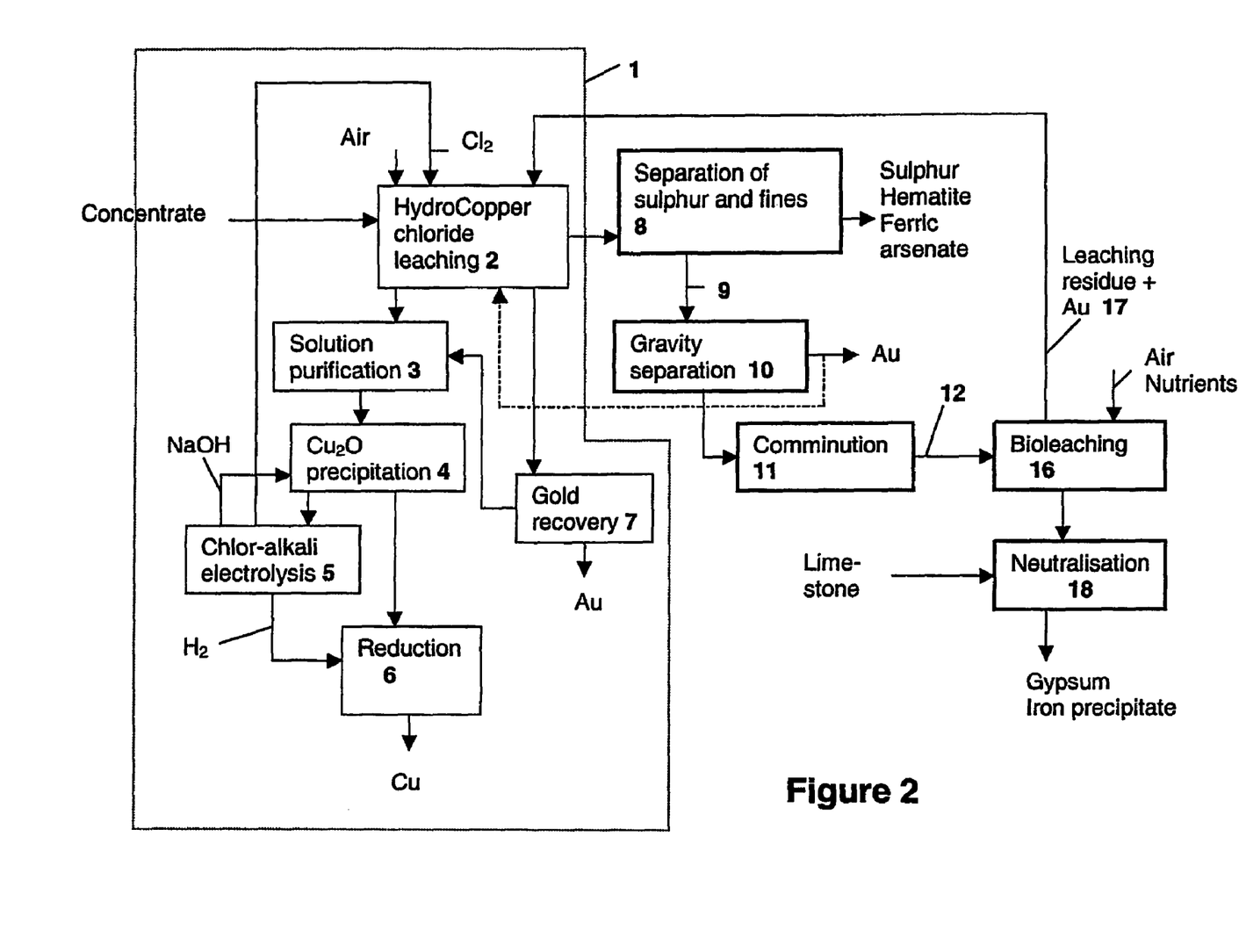
FIG. 2 is a flowchart of another embodiment of the method described herein, where leaching is performed as pressure leaching.
Figure 3:
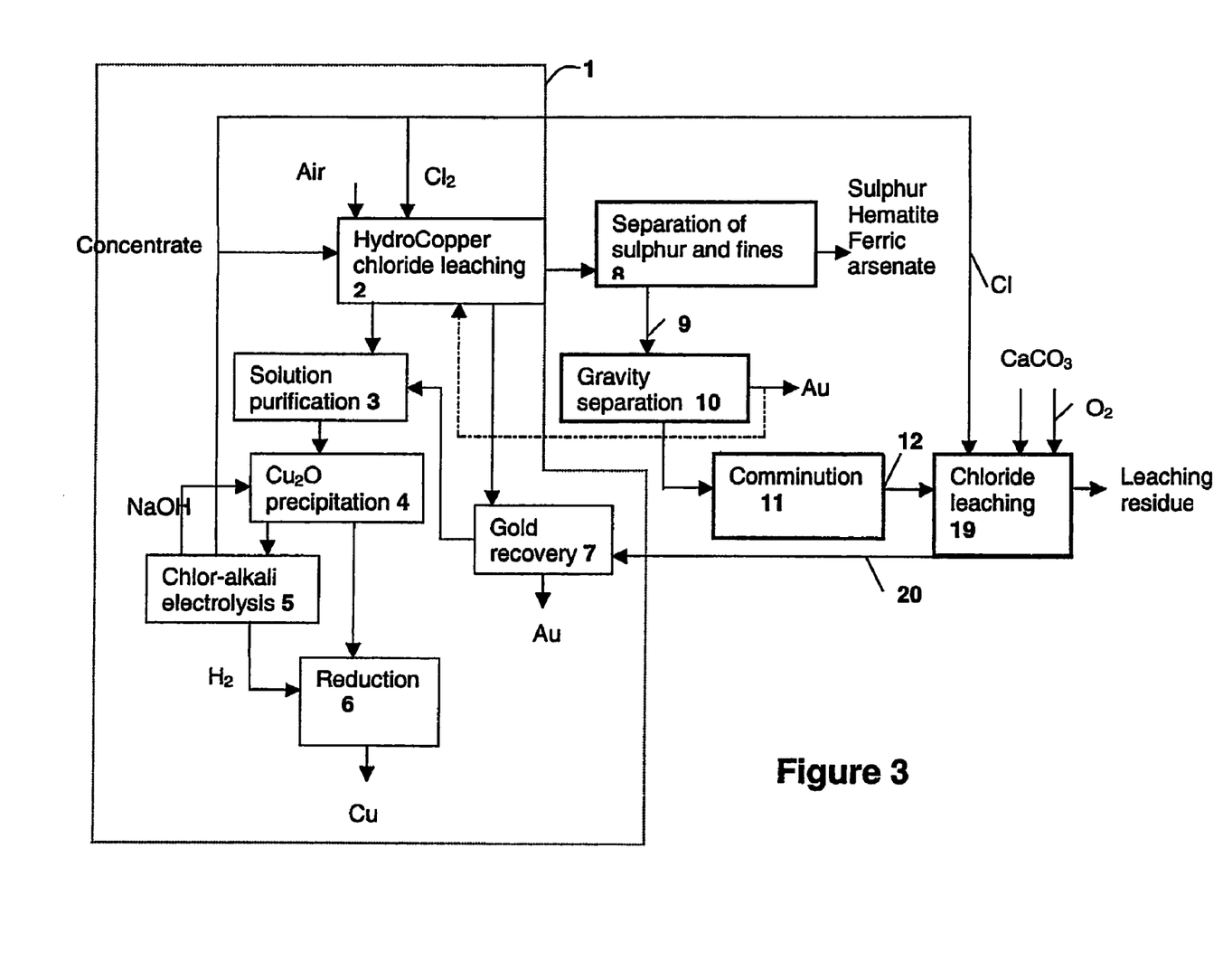
FIG. 3 is a flow chart of yet another embodiment of the method described herein, where leaching is performed as chloride leaching.

The flow charts in FIGS. 1-3 are referred to in the description of the method described herein, all of which are based on the HydroCopper process, which is marked in the drawings with a broken line and reference number 1. According to certain embodiments described herein, it is beneficial to combine the gold recovery method with the HydroCopper process and the method is in fact depicted in the drawings as connected to it. The method and its applications can, however, also be connected to other chloride leaching processes.

The gold-containing copper concentrate is routed to leaching stage 2, where the concentrate is leached with a concentrated solution of alkali chloride. The copper in solution is oxidised to divalent ($Cu^{2+}$) using oxidising gas. Both oxygen-containing gas and chlorine are used as this oxidising gas. To simplify matters, the oxygen-containing gas is marked in the drawing as air, but it can also be oxygen or oxygen-enriched air. Henceforward in the description of the invention we will speak of sodium instead of alkali, but sodium can be replaced as necessary by some other alkali, such as potassium.

The copper (I) chloride solution generated in leaching is routed to solution purification stage 3. The purified solution is routed to precipitation stage 4, where the copper is precipitated from the solution as copper (I) oxide by means of sodium hydroxide. The sodium chloride formed is routed to chlor-alkali electrolysis 5, whence the caustic alkali, chlorine and hydrogen obtained are used in various stages of the process. Copper (I) oxide is reduced using the hydrogen generated in electrolysis into elemental copper in stage 6. If necessary the product can be smelted and cast. In the leaching stage of the HydroCopper process some of the gold contained in the concentrate dissolves and is recovered in stage 7, where gold is recovered using e.g. activated carbon or ion-exchange resins. The iron and arsenic that dissolved in chloride leaching are precipitated from the solution by neutralising it with a suitable alkali before gold recovery (not shown in detail in the drawing). The alkali needed for neutralisation is obtained from the chlor-alkali electrolysis of the HydroCopper process.

The leaching residue formed in concentrate leaching is routed to separation stage 8, where elemental sulphur and other secondary substances such as hematite, ferric arsenate and fine silicate material are separated using physical separation methods. Fine silicate material is formed if pressure or bioleaching is used for the final leaching of pyrite. After the separation stage, the first intermediate product 9 is left, composed mainly of pyrite, the coarser silicates, arsenopyrite and gold. At least one of the following separation methods can be used as the physical separation method: flotation, cycloning, elutriation, retarded settling, thickening, vibration, spiral separation or another equivalent method, which is applicable to differences in density, particle size or particle surface characteristics.

Gold is recovered from the first intermediate 9 obtained from the sulphur and fines separation stage 8 in stage 10 with a method based on gravity separation 10. The aim is to obtain a gold product with a significantly higher gold content that the first intermediate. If the gold content of the intermediate is for instance 30 g/t, the gold content of the product obtained from specific weight separation may be 1000-100 000 g/t. Methods can be used for separation which separate the gold particles with their high density from other mineral substances. These methods are e.g. centrifugal separation (Knelson and Falcon separators), spiral separation, shaking, vibration or another corresponding method. The gold-rich fraction obtained is returned to the HydroCopper process leaching, shown in the drawing with a broken line, or if the gold content of the concentrate is high enough, it is possible to treat it as a separate product.

The remainder of the first intermediate from the separation of free gold by gravity separation 10 is routed to the comminution stage 11, where it is ground to a sufficient fineness that the leaching rate of the sulphide minerals, which were insoluble thus far, is made to rise substantially. At the same time the gold, which is in inclusions in the gangue minerals coming with the concentrate, is released.

FIG. 1 presents one preferred leaching method for sulphides. In accordance with this alternative, the second intermediate 12 is treated in a sulphate environment in pressure leaching 13, whereby the sulphide minerals decompose. The temperature in the autoclave is 160-220° C. and the retention time depending on the case between 1-3 hours. The autoclave waste i.e. the leaching residue contains in this case mainly gold and undissolved gangue minerals as well as hematite. This fine waste 14 is routed onwards to the chloride leaching circuit 2 of the main process, where gold dissolves as a chloride complex and is recovered in the way described above. As stated earlier, fine gangue minerals go with the leaching residue from chloride leaching to the physical separation stage 8, where they are separated from the coarser material. After pressure leaching the solution is routed to neutralisation stage 15, into which some beneficial neutralising agent such as limestone is fed. In this case neutralisation mainly gives rise to precipitate containing gypsum and iron compounds and arsenic, which is removed from the circuit. The chloride leaching of gold can also be done in a separate chloride leaching circuit, whereby joint gold recovery 7 can be utilised. In this case the leaching residue goes directly into the final waste and does not get mixed with the leaching residue from the main leaching circuit.

The flow chart shown in FIG. 2 is like that of FIG. 1, except that it shows yet another way to treat the second intermediate 12 formed in the grinding stage 11. In this case the intermediate 12 generated in grinding is subjected to bioleaching 16. In bioleaching the product concerned is treated in a sulphate solution with bacteria using air for oxidation. The temperature is 30-60° C. and the retention time is typically 3-5 days. The gold-containing waste 17 from bioleaching is routed to the chloride leaching circuit 1 of the HydroCopper process, in which gold dissolves as a chloride complex and is recovered in the method described above. The fine gangue minerals in the waste 17 are separated in the physical separation stage 8. The bioleaching solution is routed to the neutralisation stage 18, where the acid is neutralised with some beneficial neutralising agent such as limestone, and iron, arsenic and gypsum are precipitated. In this case too, chloride leaching of gold may also be done in a separate chloride leaching circuit, whereby joint gold recovery 7 can be utilised. In this case the leaching residue goes directly into the final waste and does not get mixed with the leaching residue from the main leaching circuit.

The flow chart shown in FIG. 3 is like that of FIGS. 1 and 2, except that it shows yet another way to treat the second intermediate 12 formed in the grinding stage 11. The second intermediate 12 is subjected to leaching treatment 19 in an alkali chloride solution, where a suitable cupric content and/or ferric ion content are adjusted. The alkali chloride solution is obtained from a suitable stage of the HydroCopper process (not shown in the drawing). The oxidising gas used is air, oxygen and/or preferably chlorine obtained from the HydroCopper process chlorine-alkali electrolysis. The temperature in leaching is 80-105° C. After leaching the gold-containing solution 20 is routed to the gold recovery stage 7 of the HydroCopper process. The leaching residue contains gypsum, iron oxides, ferric arsenate and gangue minerals such as silicates, which are removed from the circuit.

The advantage of the gold recovery method described here is that the great majority of gold is recovered in connection with copper recovery and that first the sulphur and the majority of iron is removed from the precipitate generated in this connection. Then separation of metallic gold is performed, after which the final leaching stage is carried out on only a small amount of the intermediate, which still contains the gold that is difficult to dissolve and is bound inside the minerals. The residue or solution formed in the final leaching stage, depending on the leaching method, is routed to the chloride leaching circuit of the total amount of concentrate, where gold dissolves as a chloride complex and is recovered in the gold recovery stage of the main stream.

Example 1

A mixture was made, which was 50% copper concentrate and 50% gold concentrate. The gold concentrate represented a difficult type and the yield of gold from it in a 24-hour cyanide leaching test was 3%. Mineralogical studies showed that the majority of the undissolved gold of the gold concentrate was bound to pyrite and arsenopyrite as "invisible gold". The gold was divided between pyrite and arsenopyrite in roughly a 50:50 ratio. The chemical composition of the concentrates is shown in Table 1 and the mineral composition of the main minerals in Table 2.

TABLE 1

Composition of concentrates and bulk concentrate.

| | Cu % | Fe % | Zn % | As % | S % | Au g/t |
|---|---|---|---|---|---|---|
| Cu concentrate | 27.3 | 34.5 | 3.05 | 0 | 35.6 | 6.3 |
| Au concentrate | 0.92 | 35.2 | 0.90 | 7.59 | 38.0 | 34.4 |
| 50/50 mixture | 14.1 | 34.8 | 2.00 | 3.8 | 36.8 | 20.4 |

TABLE 2

Mineral composition of leaching feed

| Copper pyrite % | Arsenopyrite % | Iron pyrites % | Zinc blende % | Other minerals % |
|---|---|---|---|---|
| 41.0 | 7.8 | 37.5 | 3.4 | 13.7 |

Laboratory-scale chloride leaching was carried out on the combined concentrate in a 10-liter titanium reactor using HydroCopper process conditions:

Volume of solution 9.0 liters

Solids mass 1.6 kg

Temperature 95° C.

Retention time 24 h

NaCl 280 g/l $Cu^{2+}$ content: 40 g/l pH: 2.0-2.2

Air: 2 l/min

Redox: 560-620 mV (vs. Ag/AgCl)

The composition of the solids after leaching was as follows:

TABLE 3

Solids mass and composition after leaching.

| Mass % of feed | Cu % | Zn % | As % | Fe % | S % | S° % | Au g/t |
|---|---|---|---|---|---|---|---|
| 92.7 | 0.38 | 0.05 | 3.9 | 35.2 | 37.3 | 15.7 | 11.0 |

Leaching produced a yield of 97.5% copper and 50.1% gold. During leaching, elemental sulphur, goethite and ferric arsenate were formed. A small amount of sulphide sulphur changed into sulphate form. 74% of the arsenopyrite dissolved, but the degree of dissolution of the pyrite was only about 4%. The majority of undissolved gold appeared in the pyrite.

The leaching residue was subjected to treatment based on physical separation methods, where the aim was mainly to separate elemental sulphur, iron oxides, ferric arsenate and fine silicate material from the pyrite, arsenopyrite and coarse silicates. A combination of flotation and elutriation was used in physical separation. At first flotation of elemental sulphur was carried out in a flotation cell, where the frother was MIBC (methyl-isobutyl-carbinol). The pyrite and other coarse material was removed from the flotation concentrate by mixing it in an elutriation cell, to which at the same time water was added at a constant rate so that the desired separation limit was reached. The flotation residue was also treated using the elutriation method mentioned above, whereby the majority of fine material (fine silicates, goethite, hematite, ferric arsenate and the remaining sulphur were separated out. Clean separation was made on the separation overflow, whereby pyrites and other coarse material were recovered. The coarse fractions were combined into one product (underflow) and the fine material into another product (overflow).

In physical separation, solids with a mass of 56.1% of that of the separation stage feed remained as underflow. The composition of the solids after treatment was as follows:

TABLE 4

Composition of the solids after physical separation stage.

| Cu % | As % | Fe % | S % | S° % | Au g/t |
|---|---|---|---|---|---|
| 0.49 | 2.0 | 38.4 | 47.3 | 5.0 | 18.2 |

According to mineralogical examination, the separation product (underflow) contained about 65% pyrites and 13% gangue minerals. The yield of elemental sulphur in the overflow was about 80% and the yield of pyrite in the underflow about 90%. The yield of gold in the underflow was 94%.

The product obtained was pulverised for 25 minutes in a 1-liter attrition mill, resulting in a particle size of 80%–12 μm. The product obtained (=underflow) underwent a chloride leaching test in a 3-liter titanium reactor in the following conditions:

Volume of solution: 2.6 liters

Solids mass 0.25 kg

Temperature 95° C.

Retention time 24 h

Oxidant: Chlorine gas, air

NaCl 280 g/l $Cu^{2+}$ content: 40 g/l pH: 1.2-1.6

Redox: 600-750 mV (vs. Ag/AgCl)

After leaching the solids content was as follows:

TABLE 5

Composition of solids after chloride leaching

| Mass of feed % | Cu % | Zn % | As % | Fe % | S % | S° % | Au g/t |
|---|---|---|---|---|---|---|---|
| 83.1 | 0.37 | 0.06 | 2.8 | 46.2 | 7.7 | 2.3 | 1.8 |

The gold yield in chloride leaching was 85.2%. The overall yield of gold from the concentrate (see Table 2) was 92.8%.

Example 2

The product from chloride leaching and physical separation presented in Example 1 (underflow) was pressure leached in a 1.5-liter titanium autoclave in the following conditions:

Solids mass: 200 g

Volume of solution: 1.2 liters

Oxygen flow: 1.0 l/min

Temperature 200° C.

Retention time 2 h

Overpressure of oxygen 7 bar

After treatment the solids content was as follows:

TABLE 6

Composition of solids after pressure leaching treatment.

| Mass of feed % | Cu % | Zn % | As % | Fe % | S % | S° % | Au g/t |
|---|---|---|---|---|---|---|---|
| 76.9 | 0.46 | 0.06 | 4.2 | 49.8 | 4.7 | 1.6 | 23.7 |

Example 3

Chloride leaching was carried out on the residue obtained from the pressure leaching of Example 2 in HydroCopper process conditions.

Volume of solution: 1.2 liters

Mass of solids 0.12 kg

Temperature 95° C.

Retention time 24 h

Oxidant: Chlorine gas, air

NaCl 280 g/l $Cu^{2+}$ content: 40 g/l pH: 2.0-2.2

Redox: 580-650 mV (vs. Ag/AgCl)

The composition of the leaching residue was as follows:

TABLE 8

Composition of solids after chloride leaching of pressure leaching residue.

| Mass of feed % | Cu % | Zn % | As % | Fe % | S % | S° % | Au g/t |
|---|---|---|---|---|---|---|---|
| 99.4 | 0.41 | 0.05 | 3.2 | 13.5 | 4.5 | 1.5 | 1.4 |

The gold yield in chloride leaching of the autoclave residue was 93.9%. When the whole chain is calculated from the original concentrate (Table 2), the gold yield was 93.8%.

The invention having been described above with reference to certain specific embodiments thereof, it will be recognized that these embodiments do not limit the scope of the appended claims.

The invention claimed is:

1. A method for the recovery of gold from a sulphidic concentrate, comprising:
    leaching the sulphidic concentrate in a first leaching in atmospheric conditions using an aqueous leaching solution comprising alkali chloride-copper (II) chloride;
    regulating the potential of the leaching solution to be at least 600 mV Ag/AgCl at the end of leaching;
    separating a leachate solution containing dissolved gold from leaching precipitate remaining undissolved in the first leaching; and
    recovering the dissolved gold from the first leachate solution;
    physically separating the precipitate remaining undissolved in the first leaching into fine material comprising elemental sulphur and a majority of iron oxides and arsenic oxides present in the leaching remaining undissolved in the first leaching and a gold-containing first intermediate product which comprises pyrites, arsenopyrite and coarse gangue minerals;
    separating coarse, undissolved gold from the gold-containing first intermediate product using gravity separation to form a gold-containing product and a fraction containing pyrite and gangue minerals;
    comminuting the fraction containing pyrite and gangue minerals to form a second intermediate product;
    leaching the second intermediate product in a second leaching to form a leachate solution containing the pyrite and arsenopyrite and a gold-containing residue
    returning the gold-containing residue to the first leaching or to said recovering the dissolved gold from the first leachate solution.

2. The method according to claim 1, further comprising returning the gold-containing product of said gravity separation first leaching.

3. The method according to claim 1, further comprising treating the gold-containing product of said gravity separation as a separate product.

4. The method according to claim 1, wherein said comminuting comprises grinding the gold-containing first intermediate to a particle size having $d_{80}$=5-45 microns.

5. The method according to claim 4, wherein said particle size has $d_{80}$=5-15 microns.

6. The method according to claim 1, wherein said second leaching is performed in a sulphate-based pressure leaching stage, into which oxygen-containing gas is fed and wherein said gold-containing residue comprises a gold-containing precipitate, which is routed to the first leaching.

7. The method according to claim 6, further comprising physically separating the gold-containing precipitate from fine gangue minerals.

8. The method according to claim 6, further comprising neutralizing a solution formed in said sulphate-based pressure leaching stage, forming an iron precipitate, and removing said iron precipitate.

9. The method according to claim 1, wherein the second leaching is performed in a sulphate-based bioleaching stage, into which air and nutrients are fed.

10. The method according to claim 9, further comprising physically separating the fine gangue minerals from the gold-containing residue.

11. The method according to claim 9, further comprising neutralizing a solution formed in the sulphate-based bioleaching stage, forming an iron precipitate, and removing said iron precipitate.

12. The method according to claim 8, wherein said neutralizing comprises adding limestone.

13. The method according to claim 1, wherein said second leaching comprises an atmospheric alkali chloride leaching, in which the oxidising gas used is one of chlorine, oxygen, or an oxygen-containing gas, and further comprising regulating the oxidation-reduction potential of the leaching solution using the oxidising gas to the range of 620-750 mV Ag/AgCl.

14. The method according to claim 13, wherein said second leaching comprises the dissolving of gold, pyrite and arsenopyrite, and further comprising neutralizing the solution formed precipitate out iron and arsenic, and removing a residue containing gangue minerals and iron compounds.

15. The method according to claim 14, further comprising routing the solution routed to said recovering of the dissolved gold.

16. The method according to claim 1, wherein the recovering of the dissolved gold comprises contacting with activated carbon.

17. The method according to claim 1, wherein the recovering of the dissolved gold comprises contacting with ion-exchange resins.

18. A method according to claim 1, wherein said physically separating the precipitate remaining undissolved in the first leaching comprises at least one of the following methods: flotation, cyclone separation, elutriation, retarded settling, vibration and/or spiral separation.

19. The method according to claim 1, wherein the gravity separation comprises at least one of the following methods: centrifugal separation, spiral separation, shaking and/or vibration.

20. The method according to claim 1, wherein said alkali chloride-copper (II) chloride of said first leaching is formed in a chlorine-alkali electrolysis belonging to a copper recovery circuit.

21. The method according to claim 1, wherein said first leaching stage dissolves iron and arsenic, and further comprising precipitating said iron and arsenic from the solution by neutralisation with a suitable base prior to gold recovery.

22. A method according to claim 21, wherein the suitable base is sodium hydroxide.

23. The method according to claim 21, wherein the suitable base is formed in a chlorine-alkali electrolysis belonging to a copper recovery circuit.

24. The method according to claim 1, wherein said sulphidic concentrate comprises copper, arsenopyrite, pyrite, or a combination of these.

\* \* \* \* \*